May 9, 1944.    A. H. MITTAG    2,348,653
ELECTRIC VALVE PROTECTIVE CIRCUITS
Filed Nov. 5, 1941
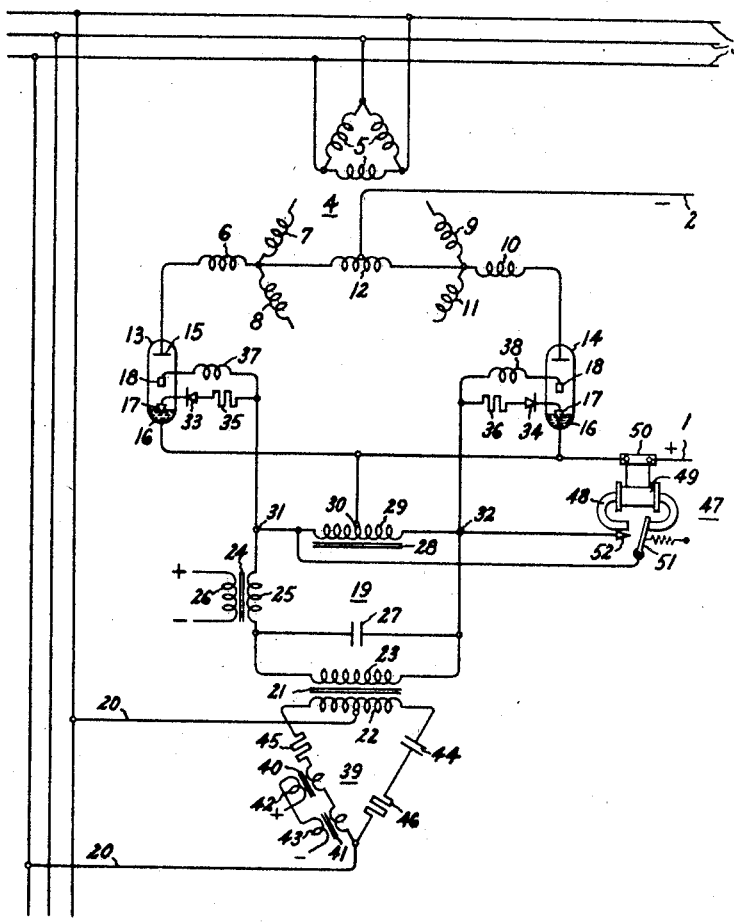
Inventor:
Albert H. Mittag,
by Harry E. Dunham
His Attorney.

Patented May 9, 1944

2,348,653

UNITED STATES PATENT OFFICE 2,348,653

ELECTRIC VALVE PROTECTIVE CIRCUIT

Albert H. Mittag, Schenectady, N. Y., assignor to General Electric Company, a corporation of New York Application November 5, 1941, Serial No. 417,932

2 Claims. (Cl. 175—363)

My invention relates to electric valve protective circuits and more particularly to arc-back suppression circuits for electric discharge devices or electric valve means of the type employing ionizable mediums such as gases or vapors.

In accordance with the teachings of my invention appearing hereinafter, I provide new and improved electric valve circuits for controlling the operation of electric valve means in response to an abnormal operating condition, such as that occasioned by an arc-back.

It is an object of my invention to provide new and improved control or protective circuits for electric valve means.

It is another object of my invention to provide new and improved arc-back suppression circuits for electric valve translating apparatus of the type employing an ionizable medium and comprising a control member of the immersion-ignitor type.

It is a further object of my invention to provide new and improved protective circuits for electric valve means of the type comprising an immersion-ignitor control member, and in which impulses of current are transmitted to the control members during normal operation by the excitation circuit and in which the excitation circuit is controlled in response to the occurrence of an arc-back condition to suppress the arc-back and restore the system to normal operation after the occurrence of the arc-back.

Briefly stated, in the illustrated embodiment of my invention I provide new and improved protective or arc-back suppression circuits for controlling the operation of electric valve means using immersion-ignitor control members. Excitation circuits of the type comprising saturable inductive devices for providing impulses of voltage of peaked wave form during normal operation are connected to the control members of the electric valve means, and the excitation circuits are controlled in response to the occurrence of an arc-back condition to discontinue the application of energizing voltage or current to the control members upon the occurrence of an arc-back condition or so long as the arc-back condition exists.

For a better understanding of my invention, reference may be had to the following description taken in connection with the accompanying drawing, and its scope will be pointed out in the appended claims. The single figure of the drawing diagrammatically illustrates an embodiment of my invention as applied to an excitation circuit wherein the peaks of voltage are produced by saturable inductive means, and wherein the excitation circuit is prevented from operating by shunting an element of the excitation circuit.

Referring now to the accompanying drawing, my invention is there illustrated as applied to a polyphase rectifying or translating system for energizing a direct current load circuit including a positive conductor 1 and a negative conductor 2 from an alternating current supply circuit 3. The electric translating apparatus also comprises an inductive network including a plurality of electrically displaced windings which may be provided by a transformer 4 including a plurality of primary windings 5 and two groups of electrically displaced secondary windings 6, 7, 8 and 9, 10, 11. The two groups of secondary windings may be connected in the conventional double Y arrangement wherein the neutral connections of the respective groups of secondary windings are interconnected through an interphase transformer 12 which is connected to one terminal, such as the negative terminal, of the direct current load circuit. Electric valve means are associated with the various secondary windings 6–11, inclusive. For the purpose of illustrating my invention only the electric valve means 13 and 14, which are connected to diametric windings 6 and 10, are illustrated. It is to be understood, of course, that electric valve means (not shown) are also connected to windings 7, 8, 9 and 11.

Electric valve means 13 and 14 are of the type comprising an ionizable medium, such as a gas or a vapor, and each comprises an anode 15, a cathode 16, an immersion-ignitor control member 17 associated with the cathode 16 and may include a relieving or transfer anode 18 which is employed to reduce the duty imposed on control member 17 by transmitting a substantial portion of the excitation current after the initiation of an arc discharge by the proper energization of the control member.

The immersion-ignitor control members 17 are of the type constructed of a material having a relatively high resistivity as compared with that of the mercury of the associated cathodes. These control members may be constructed of a material such as boron carbide or silicon carbide. Arc discharges are established within the electric valve means by the transmission through the control members and the cathodes of a predetermined minimum or critical value of current.

I employ a plurality of excitation circuits for energizing the control members 17 of the electric valve means associated with windings 6–11, inclusive. Only excitation circuit 19, which energizes the control members 17 of the electric valve means 13 and 14, is illustrated. It will be understood that two other excitation circuits, similar to excitation circuit 19, are employed in connection with electric valves connected to the respective diametrically opposed windings 8, 9 and 7, 11.

Excitation circuit 19 may be of the type disclosed and claimed in my copending joint patent application Serial No. 374,716, filed January 16, 1941, and which is assigned to the assignee of this application. The excitation circuit 19 is energized from a suitable source of alternating current 20, or may be connected to the supply circuit 3. The excitation circuit 19 comprises a transformer 21 having a primary winding 22 and a secondary winding 23. A saturable inductive device 24, having a winding 25 and a control winding 26, is connected in circuit with the secondary winding 23 of transformer 21. A capacitance 27 constitutes with the inductive reactance of device 24 a resonant circuit of the nonlinear type; that is, the circuit is nonlinearly resonant with respect to the magnitude of the voltage of source 20. The inductive reactance of the device 24 has a value which is substantially greater than the capacitive reactance of the excitation circuit 19 within the lower region of the voltage of the source, and a substantially smaller inductive reactance within the upper region of voltage so that an impulse of voltage is produced when inductive device 24 saturates. It is to be understood that this circuit, including a capacitance 27 and the inductive device 24 is nonlinearly resonant with respect to the magnitude of the voltage of the source 20, and that the inductive device 24 saturates during both the positive and negative half cycles of voltage of the source. The control winding 26 of device 24 may be termed a biasing winding to shift the phase displacement between the positive and negative impulses of current transmitted by winding 25 to provide a means for balancing the current conducted by the respective groups of secondary windings in the electric valve translating system. A suitable means, which may be an impedance means such as an auto-transformer 28 having a winding 29, is connected in circuit with winding 25 and capacitance 27. An intermediate or neutral connection 30 of winding 29 is connected to the common junctures of the cathodes 16 of the electric valve means, and the voltage appearing across terminals 31 and 32 is an alternating voltage of peaked wave form of which the positive and negative peaks are symmetrical.

The excitation circuit 19 is connected to control members 17 of electric valve means 13 and 14 through unidirectional conducting devices 33 and 34 and transfer resistances 35 and 36, respectively. Suitable current smoothing means, such as inductances 37 and 38, may be connected between the excitation circuit and the relieving anodes 18 and which provide a path through relieving anodes 18 for the greater portion of the excitation current after arc discharges have been established within the respective electric valve means.

I employ a phase shifting and stabilizing circuit 39 which is connected between the source 20 and the transformer 21. The phase shifting circuit is of the static impedance type and includes a variable impedance element such as saturable inductive devices 40 and 41 including control windings 42 and 43 which are variably energized by unidirectional current to control the magnitude of the inductive reactance of the devices. Another branch of the phase shifting circuit may comprise a reactance of opposite sign, such as a capacitance 44. Stabilizing resistances 45 and 46 may be connected in the phase shifting circuit 39 and cooperate with the excitation circuit 19 so that the positive and negative peaks of the voltage produced by excitation circuit 19 are symmetrical. The effect of the resistances 45 and 46 is introduced into the excitation circuit 19 through transformer 21.

In order to suppress arc discharges within the electric valve means 13 and 14 and to protect the electric valve means in response to an abnormal operating condition, such as that occasioned by arc-back, I provide means for controlling the excitation circuit 19 in response to a predetermined electrical condition of either the supply circuit or the load circuit. In the modification of my invention shown in Fig. 1 a relay 47 is connected to be responsive to a reverse current condition of the direct current load circuit occasioned by the arc-back of any one of the electric valve means. It will be appreciated that instead of connecting the relay 47 in the direct current load circuit, I may employ means responsive to the individual anode-cathode currents of the electric valves and connected between the anodes 15 and the windings 6-11, or connected between the individual cathodes and the conductor 4. The relay 47 is of the current directional type comprising a core member 48 which is polarized and an actuating coil 49 which is energized in response to the voltage appearing across a shunt 50 connected in the direct current circuit and which includes a movable member or armature 51 which may be spring biased to the open circuit position and arranged to engage a contact 52 when the current reverses.

The relay 47 is connected to shunt or short-circuit the winding 29 of auto-transformer 28, thereby preventing the application of energizing voltage to the control members 17 of electric valve means 13 and 14 in response to an arc-back condition. Relay 47 may be arranged as illustrated to effectively shunt winding 29 so long as the reverse current condition exists, and arranged to remove the shunt connection as soon as the arc-back is suppressed. It will be readily appreciated that I may employ a relay which is locked or maintained in the energized position in response to the occurrence of an arc-back so that a manual or automatic resetting operation is required in order to reinitiate operation of the system.

The operation of the illustrated embodiment of my invention will be explained by considering the system when it is operating as a polyphase rectifier to supply unidirectional current to the load circuit. The electric valve means associated with windings 6-11, inclusive, conduct current in a predetermined order determined by the order of phase rotation, each electric valve means conducting current during 120 electrical degrees of each cycle of the voltage of the supply circuit 3 but each electric valve conducting current for only 60 electrical degrees with any one other electric valve in the other group.

During normal operation of the electric valve translating system pairs of electric valve means, such as electric valve means 13 and 14 associated with diametrically opposed secondary windings, conduct current during 120 electrical degree intervals with respect to the voltage of supply circuit 3 and which are displaced substantially 180 electrical degrees. The alternating voltage of peaked wave form appearing across winding 29 serves to render the electric valve means 13 and 14 conducting. When terminal 31 is positive relative to terminal 32, a unidirectional impulse of current is transmitted to control member 17 of electric valve means 13 to render electric valve means 13 conducting. One-half cycle later, when terminal 32 is positive relative to terminal 31, an impulse of unidirectional current is transmitted to control member 17 of electric valve means 14.

If an arc-back occurs in connection with any one of the electric valve means, such as electric valve means 13, the occurrence of reverse current in the direct current load circuit will cause actuation of relay 47, thereby shunting winding 29 and preventing the further application of energizing voltage to the control members 17, and preventing subsequent operation of the electric valve means and affording a satisfactory way of suppressing the arc-back condition. When the arc-back condition no longer exists, the shunt circuit around winding 29 is automatically opened and the system is restored to normal operation. While the relay 47 of Fig. 1 is shown as being associated with only one excitation circuit, it will be appreciated that the relay 47 may be provided with two additional insulated contacts which similarly control the other excitation circuits which are connected to the electric valves associated with windings 7, 11 and 8, 9.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a supply circuit, a load circuit, electric translating apparatus connected between said circuits and comprising an electric valve means of the type employing an ionizable medium and including an anode, a cathode and an immersion-ignitor control member, an excitation circuit connected to said control member for transmitting thereto impulses of current of peaked wave form and comprising a source of alternating current, a saturable inductive device and means connected in circuit with said saturable inductive device and responsive to the current therethrough, and means responsive to an electrical condition of one of the first mentioned circuits for shunting said last mentioned means to prevent application of said voltage of peaked wave form to said control member to maintain said control member deenergized and thereby prevent excitation of said cathode.

2. In combination, an alternating current supply circuit, a load circuit, electric translating apparatus connected between said circuits and comprising a pair of electric valve means each of the type employing an ionizable medium and each including an anode, a cathode and an immersion-ignitor control member, an excitation circuit connected to the control members of said pair of electric valve means to render said electric valve means conducting during intervals displaced 180 electrical degrees relative to the voltage of said supply circuit and comprising a source of alternating current, a saturable inductive device and means connected in circuit with said inductive device to produce across its terminals an alternating voltage of peaked wave form having substantially symmetrical positive and negative peaks in accordance with the current transmitted by said saturable inductive device, means for connecting the terminals of said last mentioned means to said control members, means connecting a terminal of said last-mentioned means intermediate said first-mentioned terminals with the cathodes of said electric valve means, and means responsive to an electrical condition of one of the first mentioned circuits occasioned by an arc-back of said electric valve means for effectively shunting the means which is connected in circuit with said saturable inductive device to maintain said control members deenergized and thereby prevent excitation of said cathode.

ALBERT H. MITTAG.